(12) United States Patent
Mukouhara

(10) Patent No.: US 9,249,842 B2
(45) Date of Patent: Feb. 2, 2016

(54) POWER UNIT FOR MOTORCYCLE

(71) Applicant: HONDA MOTOR CO., LTD., Tokyo (JP)

(72) Inventor: Hodaka Mukouhara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 94 days.

(21) Appl. No.: 14/157,654

(22) Filed: Jan. 17, 2014

(65) Prior Publication Data

US 2014/0296029 A1 Oct. 2, 2014

(30) Foreign Application Priority Data

Mar. 28, 2013 (JP) ................................. 2013-070157

(51) Int. Cl.
*F16D 25/08* (2006.01)

(52) U.S. Cl.
CPC ............ *F16D 25/083* (2013.01); *F16D 25/086* (2013.01); *Y10T 477/6403* (2015.01)

(58) Field of Classification Search
None
See application file for complete search history.

(56) References Cited

U.S. PATENT DOCUMENTS

| | | | | |
|---|---|---|---|---|
| 4,518,070 A | * | 5/1985 | Ooka | 192/85.5 |
| 4,565,269 A | * | 1/1986 | Kawasaki et al. | 192/70.12 |
| 4,566,577 A | * | 1/1986 | Tsuboi | 192/85.5 |
| 8,662,253 B2 | * | 3/2014 | Terada et al. | 184/6.5 |
| 2009/0235782 A1 | * | 9/2009 | Shiozaki et al. | 74/665 K |
| 2009/0287386 A1 | * | 11/2009 | Tomoda | 701/67 |
| 2010/0072019 A1 | * | 3/2010 | Ogasawara | 192/48.611 |
| 2011/0226080 A1 | * | 9/2011 | Ieda et al. | 74/473.36 |

FOREIGN PATENT DOCUMENTS

JP 4531361 B2 8/2010

* cited by examiner

*Primary Examiner* — Justin Holmes
(74) *Attorney, Agent, or Firm* — Birch, Stewart, Kolasch & Birch, LLP

(57) ABSTRACT

A power unit for a motorcycle includes an internal combustion engine with a transmission having an input shaft and an output shaft. A clutch with a hydraulic cylinder is provided for changing over the connection/disconnection of power transmission between a crankshaft and the input shaft. A cylinder support member, mounted on the engine body, includes a cylindrical case portion where a portion of the hydraulic cylinder is housed. The power unit can be miniaturized by suppressing the projection of the hydraulic cylinder from the engine body in the axial direction. A cover member is mounted on the engine body for covering and surrounding a projecting end portion of an output shaft from an engine body. A cylinder support member is mounted on the engine body such that a portion of a case portion is arranged in an opening portion formed by cutting away a portion of the cover member.

16 Claims, 6 Drawing Sheets

POWER UNIT FOR MOTORCYCLE

CROSS-REFERENCE TO RELATED APPLICATIONS

The present application claims priority under 35 USC 119 to Japanese Patent Application No. 2013-070157 filed Mar. 28, 2013 the entire contents of which are hereby incorporated by reference.

BACKGROUND OF THE INVENTION

1. Field of the Invention

The present invention relates to a power unit for a motorcycle including an internal combustion engine which has a crankshaft rotatably supported on an engine body with a transmission having an input shaft and an output shaft arranged parallel to each other and housed inside of the engine body. A clutch for changing over the connection/disconnection of power transmission between the crankshaft and the input shaft is provided with a hydraulic cylinder for driving the clutch. A cylinder support member includes a cylindrical case portion where a portion of the hydraulic cylinder is housed and is mounted on the engine body.

2. Description of Background Art

A power unit for a motorcycle is known wherein the power unit is required to satisfy a miniaturization and a reduction in the weight of the power unit. In the power unit for a motorcycle disclosed in Japanese Patent No. 4,531,361, the miniaturization and the reduction in weight of the power unit for a motorcycle are realized by shortening an inter-axis distance between an input shaft and an output shaft of a transmission. However, on the output shaft of the transmission, a drive sprocket around which a drive chain for transmitting power to a rear wheel is wound is mounted together with a connecting mechanism for connection with a drive shaft. Further, a cover member for protecting a projecting end portion of the output shaft projecting from an engine body is mounted on the engine body. Accordingly, in arranging a hydraulic cylinder for driving a clutch near the output shaft, there is no way but to arrange the hydraulic cylinder at a position displaced from the cover member in the axial direction while avoiding the cover member. In such a structure where the hydraulic cylinder is arranged on the periphery of the projecting end portion of the output shaft in an axially displaced manner from the cover member, the power unit becomes of a large size in the axial direction of the output shaft. In view of the above, there has been a demand for the realization of a structure which suppresses the projection of the hydraulic cylinder in the axial direction.

SUMMARY AND OBJECTS OF THE INVENTION

The invention has been made in view of the above-mentioned circumstances, and it is an object of an embodiment of the invention to provide a power unit for a motorcycle that can be miniaturized by suppressing the projection of a hydraulic cylinder from an engine body in the axial direction.

To achieve the above-mentioned object, a power unit for a motorcycle includes an internal combustion engine which has a crankshaft rotatably supported on an engine body with a transmission having an input shaft and an output shaft arranged parallel to each other and housed inside of the engine body. A clutch is provided for changing over the connection/disconnection of power transmission between the crankshaft and the input shaft with a hydraulic cylinder for driving the clutch. A cylinder support member is provided which includes a cylindrical case portion where a portion of the hydraulic cylinder is housed and is mounted on the engine body. A cover member for covering and surrounding a projecting end portion of the output shaft projecting from the engine body is mounted on the engine body with the cylinder support member being mounted on the engine body such that a portion of the case portion is arranged in an opening portion formed by cutting away a portion of the cover member.

According to an embodiment of the present invention, a drive sprocket around which a drive chain for transmitting power to a rear wheel side is wound is fixed to a projecting end portion of the output shaft projecting from the engine body. The cylinder support member is arranged such that a portion of the case portion overlaps with an outer periphery of the drive sprocket as viewed from the axial direction of the output shaft and the case portion is displaceable from the drive sprocket in the axial direction of the cylinder support member.

According to an embodiment of the present invention, the hydraulic cylinder is fastened to the cylinder support member by fastening the remaining members except one fastening member out of a plurality of fastening members for fastening the cylinder support member to the engine body.

According to an embodiment of the present invention, the cover member is fastened to the cylinder support member together with the hydraulic cylinder using at least one of the plurality of fastening members for fastening the hydraulic cylinder to the cylinder support member.

According to an embodiment of the present invention, the fastening member for fastening the cover member to the cylinder support member together with the hydraulic cylinder is provided independently from the fastening member for fastening the cylinder support member to the engine body.

According to an embodiment of the present invention, a chain guide is fastened to the engine body such that the chain guide prevents the removal of the drive chain from the drive sprocket, and the chain guide is arranged around the drive sprocket such that the chain guide is brought into contact with the cylinder support member at a position different from a position where the chain guide is fastened to the engine body at the time of releasing the fastening of the chain guide to the engine body.

According to an embodiment of the present invention, a pushrod for applying a push force to the clutch is connected to a piston of the hydraulic cylinder and is arranged on a center axis of the case portion with a ring portion having a through hole coaxial with the pushrod being integrally formed on the chain guide. A cylindrical member which allows the pushrod to pass therethrough, and the ring portion, which surrounds the cylindrical member and is brought into contact with the cylindrical member from a side opposite to the engine body, are sandwiched between the cylinder support member and the engine body.

According to an embodiment of the present invention, a cylindrical boss portion which receives the cylindrical member is formed on the engine body with a cutaway portion being formed on a portion of the boss portion on a side close to the drive chain.

According to an embodiment of the present invention, the cylinder support member having the case portion in which a portion of the hydraulic cylinder is housed is mounted on the engine body such that a portion of the case portion is arranged in the opening portion formed by cutting away a portion of the cover member. Accordingly, an offset amount of the hydraulic cylinder to the cover member in the axial direction can be decreased. Thus, the projection of the hydraulic cylinder from the engine body in the axial direction can be suppressed whereby the power unit can be miniaturized.

According to an embodiment of the present invention, the cylinder support member is arranged such that a portion of the case portion overlaps with the outer periphery of the drive sprocket fixed to the output shaft as viewed from the axial direction of the output shaft and the case portion is displaceable from the drive sprocket in the axial direction of the cylinder support member. Accordingly, an inter-axis distance between the input shaft and the output shaft of the transmission can be shortened. Thus, the power unit can be miniaturized in the direction which passes the axis of the input shaft and the axis of the output shaft.

According to an embodiment of the present invention, the hydraulic cylinder is fastened to the cylinder support member by making use of the remaining fastening members except one fastening member out of the plurality of fastening members for fastening the cylinder support member to the engine body. Thus, the number of parts can be reduced. Further, it is possible to easily perform an exchange operation where a sub-assembled part in a state where the hydraulic cylinder is assembled to the cylinder support member can be assembled to or removed from the engine body while maintaining the sub-assembled state.

According to an embodiment of the present invention, the cover member is fastened to the cylinder support member together with the hydraulic cylinder using the fastening member independent from the fastening member for fastening the cylinder support member to the engine body. Accordingly, the number of parts can be decreased, thus reducing the weight of the power unit.

According to an embodiment of the present invention, the fastening member that fastens the cover member to the cylinder support member together with the hydraulic cylinder is provided independently from the fastening member that fastens the cylinder support member to the engine body. Accordingly, even when only the cover member is exchanged, the cylinder support member can be kept fixed to an engine body side. Thus, it is unnecessary to adjust the cylinder support member which becomes necessary due to the removal of the cylinder support member each time the cover member is exchanged or removed whereby the cover member exchange operation is facilitated.

According to an embodiment of the present invention, the chain guide is brought into contact with the cylinder support member at a position different from the position where the chain guide is fastened to the engine body. Accordingly, it is possible to prevent a state where the chain guide is displaceable by being rotated at the time of exchanging the chain guide thus avoiding the lowering of the assembling property caused by the positional displacement of the chain guide.

According to an embodiment of the present invention, the ring portion having a through hole coaxial with the pushrod is integrally formed on the chain guide with the cylindrical member, for allowing the pushrod to pass therethrough, and the ring portion, which surrounds the cylindrical member and is brought into contact with the cylindrical member from a side opposite to the engine body, being sandwiched between the cylinder support member and the engine body. Accordingly, the chain guide can be mounted on the engine body without providing a special means for fixing the chain guide thus reducing the number of parts. Further, the chain guide can be held on an engine body side even in a state where the cover member is removed. Thus, the motorcycle can travel with the chain guide being held on the engine body even in a state where the cover member is removed such as during racing without increasing the number of parts.

According to an embodiment of the present invention, a cutaway portion is formed on a portion of the cylindrical boss portion which is formed on the engine body so as to receive the cylindrical member on a side close to the drive chain. Accordingly, an inter-axis distance between the hydraulic cylinder and the output shaft can be shortened while avoiding the interference of the drive chain with the boss portion thus miniaturizing the power unit in the direction which passes the axis of the hydraulic cylinder and the axis of the output shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
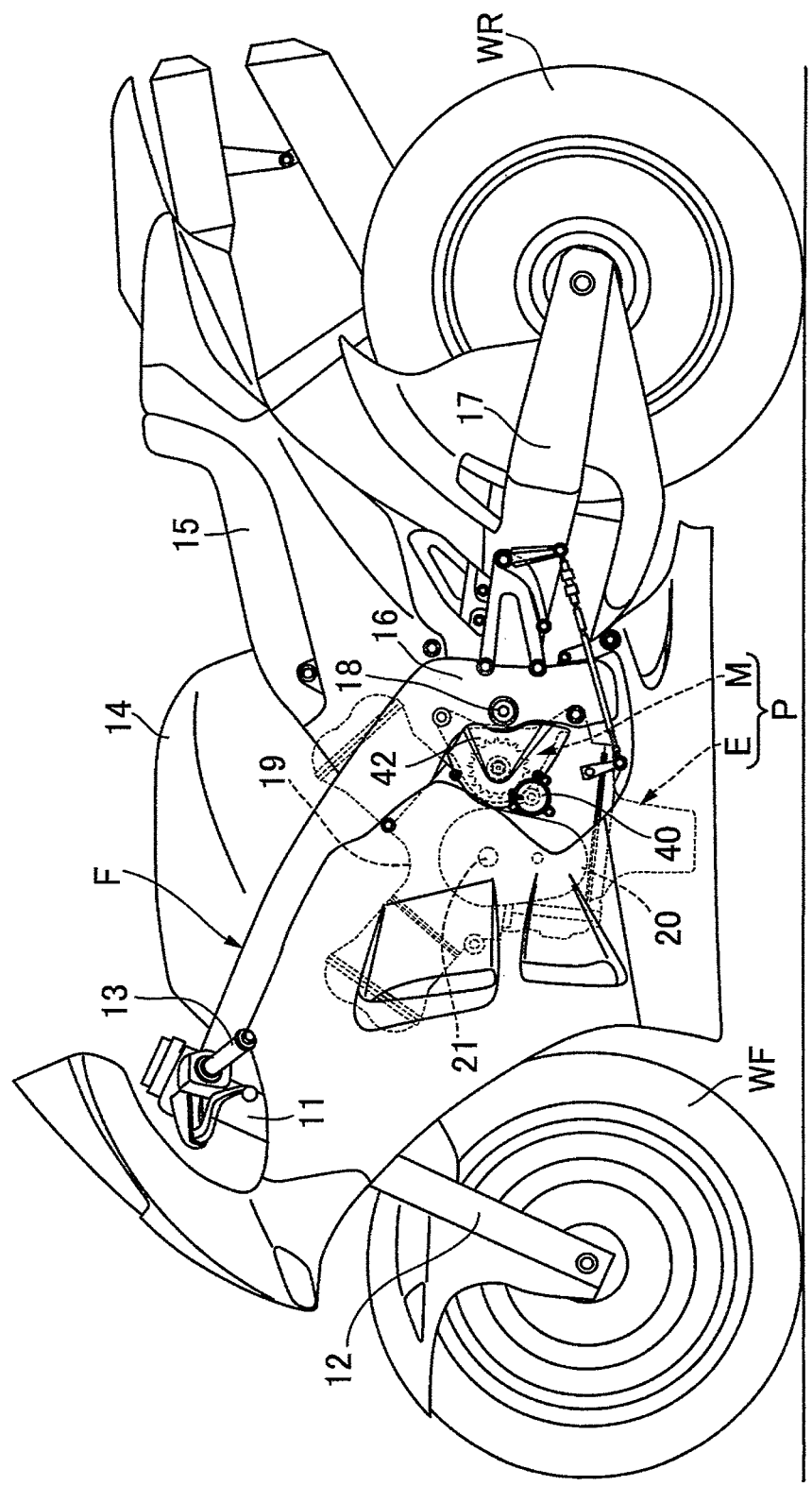
FIG. 1 is a side view of a motorcycle.

An embodiment of the present invention is explained in conjunction with the attached drawings. As illustrated in FIG. 1, a head pipe 11 is mounted on a vehicle body frame F of a motorcycle at a front end thereof. A front fork 12 which pivotally supports a front wheel WF and a steering handle 13 are steerably supported on the head pipe 11. A power unit P for generating power for driving a rear wheel WR is mounted on the vehicle body frame F in a state where the power unit P is arranged between the front wheel WF and the rear wheel WR. A fuel tank 14 is arranged above the power unit P with a rider's seat 15 being arranged behind the fuel tank 14 and supported on the vehicle body frame F.

The vehicle body frame F includes a pair of left and right pivot frames 16 . . . which is arranged behind the power unit P. A front end portion of a swing arm 17 for pivotally supports the rear wheel WR on a rear end portion thereof is swingably supported on the pivot frames 16 . . . by way of a support shaft 18.

The power unit P includes an internal combustion engine E and a transmission M which is arranged between the internal combustion engine E and the rear wheel WR. The internal combustion engine E is formed, for example, in a V-shape in a state where a crankshaft 21 having an axis thereof extending in the vehicle width direction is rotatably supported on a crankcase 20 which constitutes a portion of an engine body 19 of the internal combustion engine E. The transmission M is housed inside of the crankcase 20 of the engine body 19.

Figure 2:
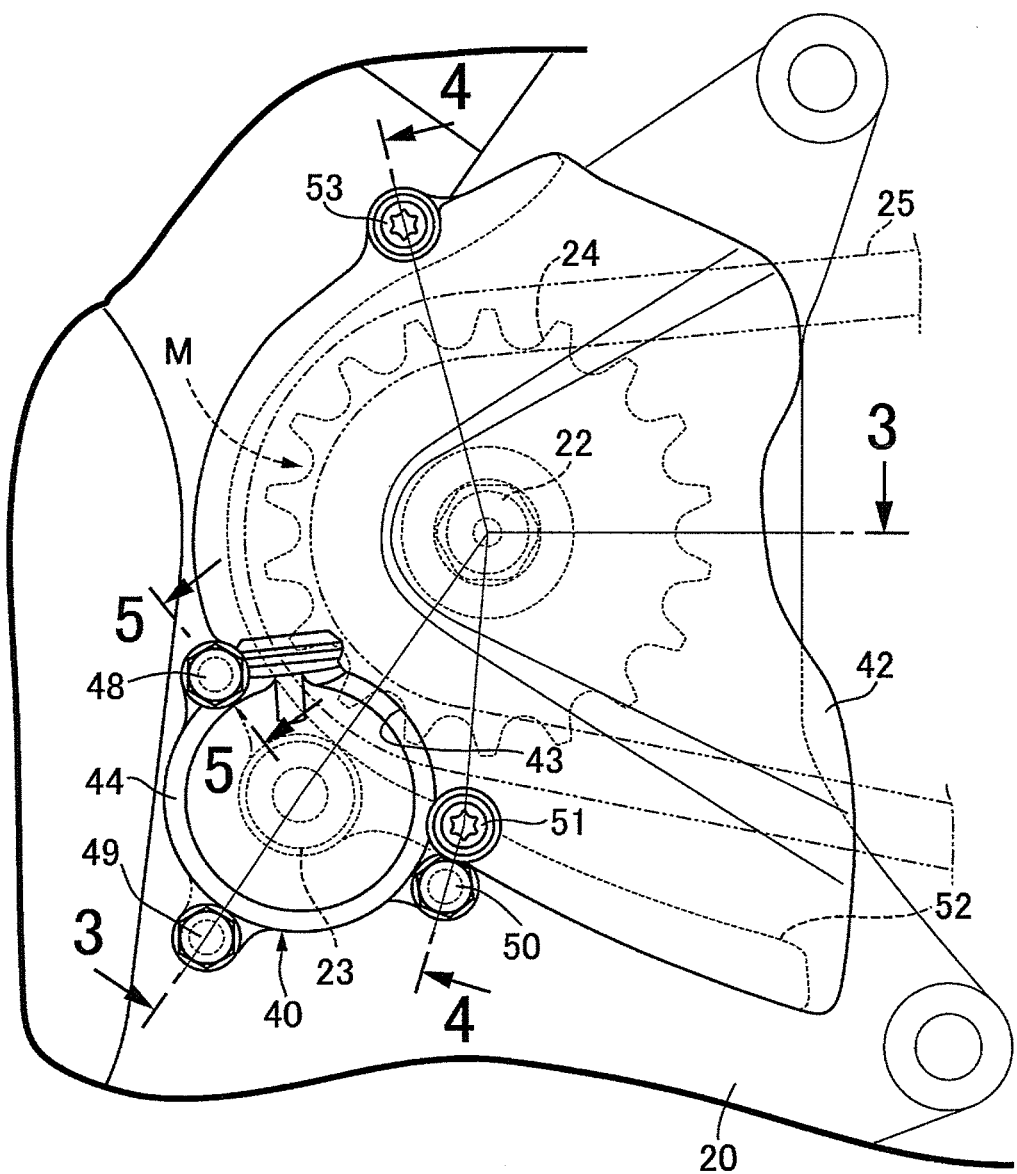
FIG. 2 is an enlarged view of an essential part in FIG. 1.
Figure 3:
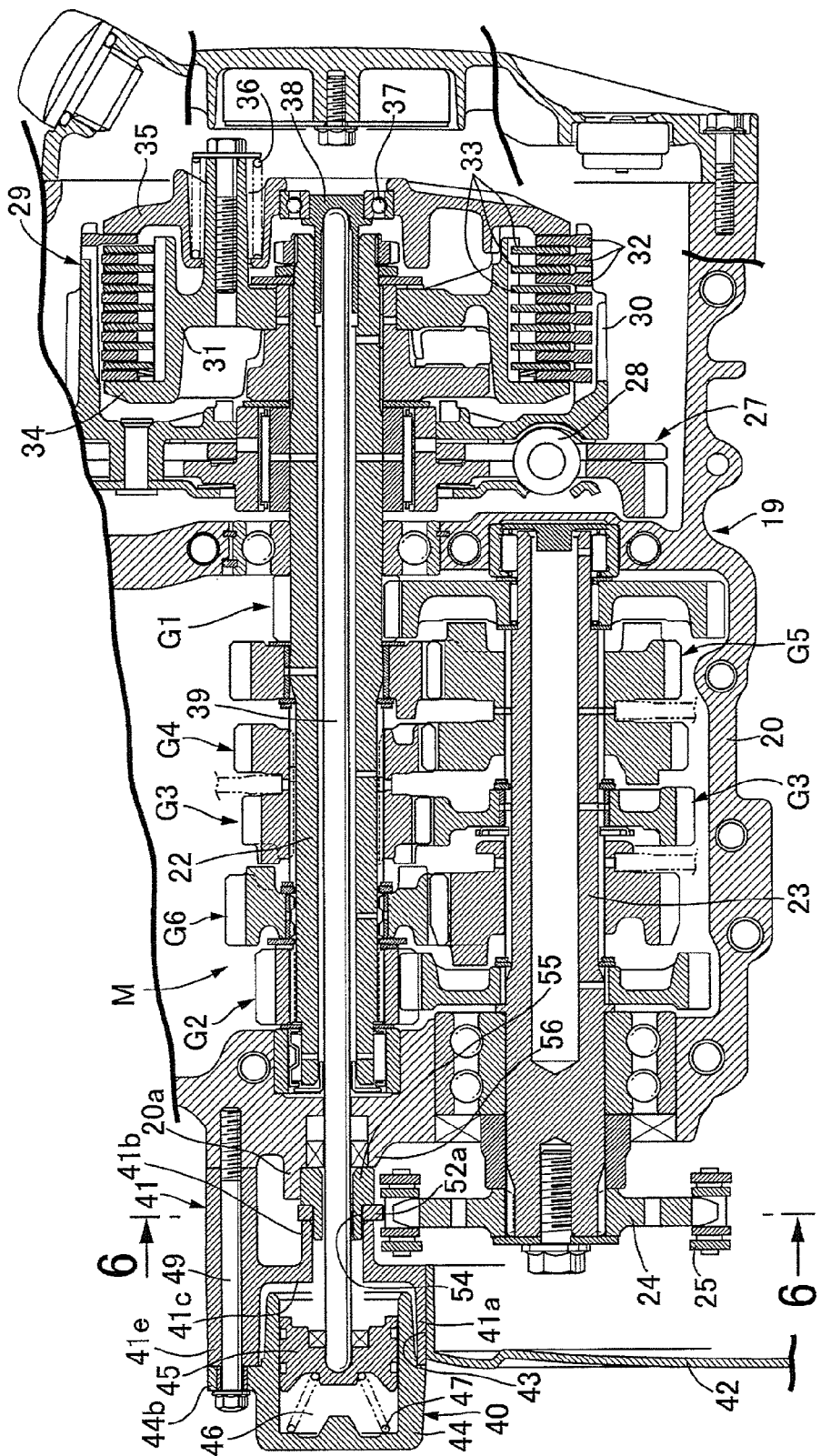
FIG. 3 is a cross-sectional view taken along a line 3-3 in FIG. 2.

In FIGS. 2 and 3, the transmission M includes an input shaft 22 and an output shaft 23 which are arranged parallel to each other with a drive chain 25 for transmitting power to a rear wheel WR side being wound around a drive sprocket 24 which is fixed to a projecting end portion of the output shaft 23 projecting from a left side wall of the crankcase 20.

The input shaft 22 and the output shaft 23 are rotatably supported on the crankcase 20 with axes thereof arranged parallel to the crankshaft 21. Gear trains having a plurality of shift positions, for example, the gear trains consisting of first to sixth gear trains G1, G2, G3, G4, G5 and G6 having six shift positions, are provided between the input shaft 22 and the output shaft 23 such that the shift positions are selectively established.

Rotational power from the crankshaft 21 is transmitted to the input shaft 22 of the transmission M by way of a primary speed reduction device 27, a damper spring 28 and a clutch 29. The clutch 29 includes a clutch outer 30 to which power is transmitted by way of the primary speed reduction device 27 and the damper spring 28 with a clutch inner 31 arranged at a center portion of the clutch outer 30 and being joined to the input shaft 22 in a relatively non-rotatable manner. A plurality of drive friction plates 32 . . . are fitted on an inner peripheral wall of the clutch outer 30 by spline fitting in an axially slidable manner. A plurality of driven friction plates 33 . . . are made to alternately overlap with the drive friction plates 32 . . . and are fitted on an outer periphery of the clutch inner 31 by spline fitting in an axially slidable manner. A pressure receiving plate 34 is integrally formed on an inner end of the clutch inner 31 so as to receive the innermost drive friction plate 32. A pressurizing plate 35 is mounted on an outer end of the clutch inner 31 in a slidable manner in a state where the pressurizing plate 35 can push the outermost drive friction plate 32. A clutch spring 36 is provided for biasing the pressurizing plate 35 toward a pressure receiving plate 34 side.

When the drive friction plates 32 . . . and the driven friction plates 33 . . . are clamped between the pressurizing plate 35 and the pressure receiving plate 34 due to a biasing force of the clutch spring 36, the clutch 29 is brought into a clutch ON state (power transmission state) where the clutch outer 30 and the clutch inner 31 are connected with each other by friction.

A release member 38 is arranged at the center portion of the clutch inner 31 in a state where a release bearing 37 is interposed between the pressurizing plate 35 and the release member 38. A push rod 39 which is inserted into the inside of the input shaft 22 having a cylindrical shape in an axially movable manner is connected to the release member 38. A hydraulic cylinder 40 capable of generating a pushing force is connected to the push rod 39. When the push rod 39 is pushed by the hydraulic cylinder 40, the pressurizing plate 35 is retracted against a spring force of the clutch spring 36. Thus, the drive friction plates 32 . . . and the driven friction plates 33 . . . are brought into a free state whereby the clutch 29 is brought into a clutch OFF state (power interruption state) where the clutch outer 30 and the clutch inner 31 are not connected with each other.

A cylinder support member 41 having a cylindrical case portion 41a which houses a portion of the hydraulic cylinder 40 therein is mounted on a left side wall of the crankcase 20. A cover member 42 which covers and surrounds the projecting end portion of the output shaft 23 projecting from the left side wall of the crankcase 20 is mounted on the left side wall of the crankcase 20. The cylinder support member 41 is mounted on the crankcase 20 such that a portion of the case portion 41a is arranged in an opening portion 43 which is formed in the cover member 42 by cutting away a portion of the cover member 42.

Figure 4:
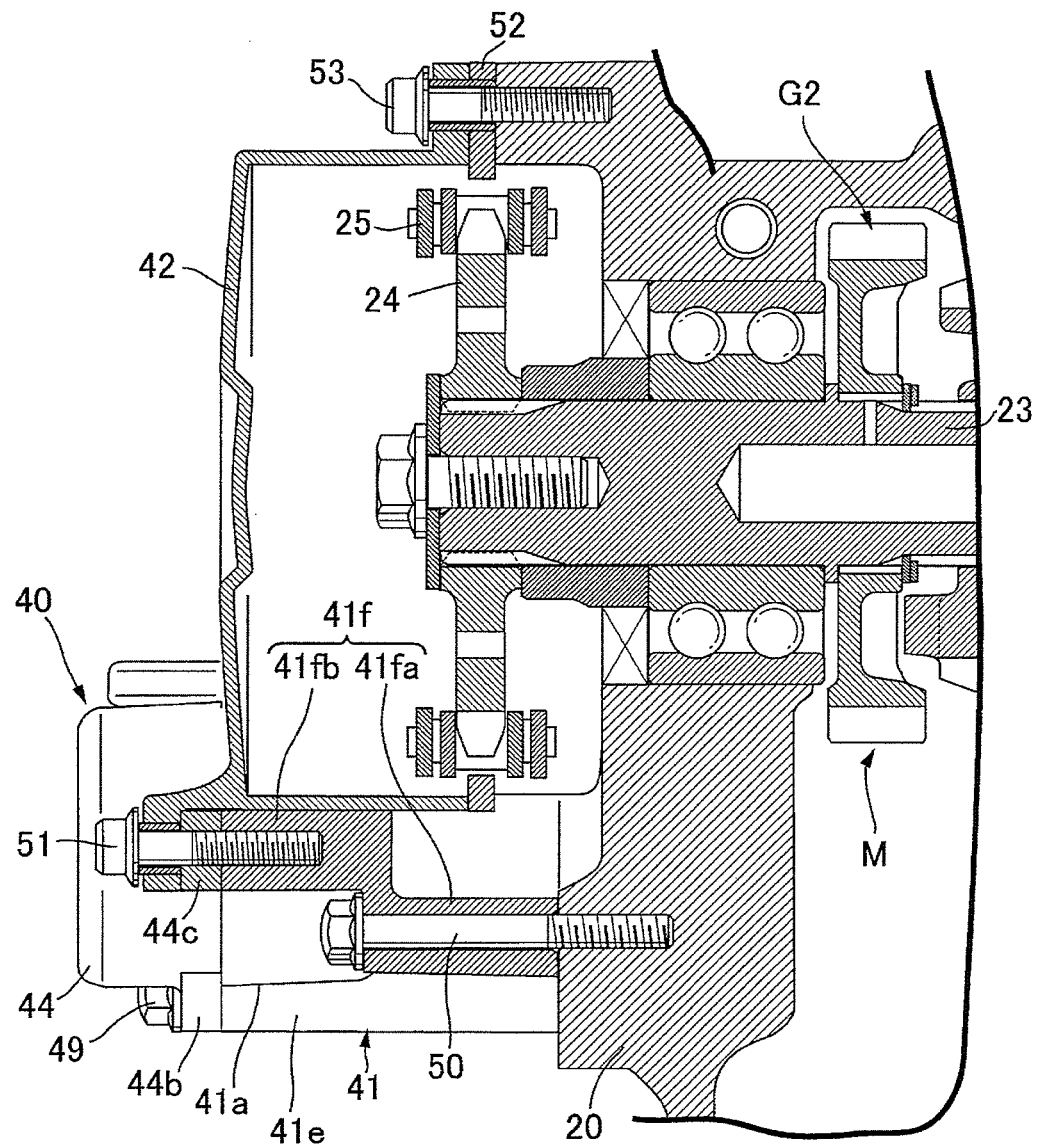
FIG. 4 is a cross-sectional view taken along a line 4-4 in FIG. 2.
Figure 5:
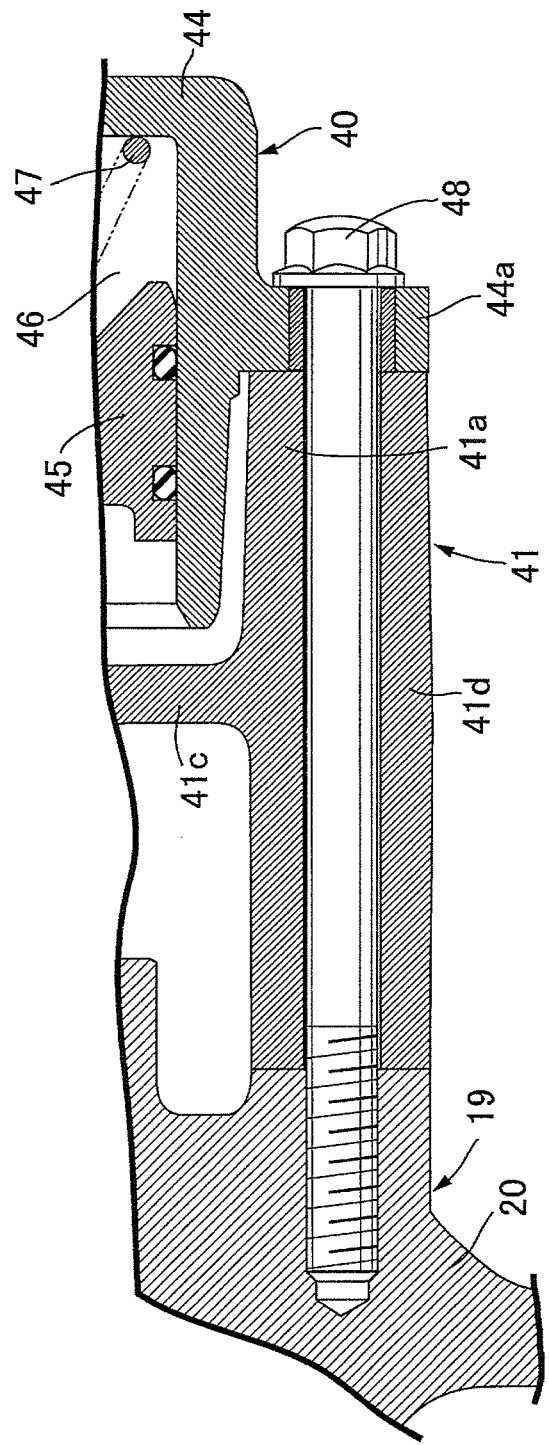
FIG. 5 is a cross-sectional view taken along a line 5-5 in FIG. 2.

To explain this embodiment also in conjunction with FIGS. 4 and 5, the cylinder support member 41 includes as integral parts thereof, the case portion 41a which is formed in a circular cylindrical shape with an extending cylindrical portion 41b which is formed with a smaller diameter than the case portion 41a and extends toward the crankcase 20 side while forming an annular stepped portion 41c between the extending cylindrical portion 41b and an inner end of the case portion 41a. First and second mounting leg portions 41d, 41e extend toward the crankcase 20 side from two portions of a front portion of the case portion 41a which are spaced apart from each other in the vertical direction. A third mounting leg portion 41f extending toward the crankcase 20 side from a rear side of the case portion 41a.

On the other hand, the hydraulic cylinder 40 includes a cylinder housing 44 which is formed in a bottomed circular cylindrical shape with a closed outer end. A piston 45 for defining a hydraulic chamber 46 between the piston 45 and the cylinder housing 44 is fitted in the cylinder housing 44 in a slidably manner, and is coaxially connected to an end portion of the push rod 39 on a side opposite to the clutch 29. A spring 47 is housed in the hydraulic chamber 46 so as to bias the piston 45 toward a side where a volume of the hydraulic chamber 46 is increased. A spring load of the spring 47 is set to a small value to an extent that the play of the piston 45 and the play of the push rod 39 in the axial direction can be suppressed.

Further, first, second and third mounting projecting portions 44a, 44b, 44c are integrally formed on the cylinder housing 44, in a projecting manner wherein the first, second and third mounting projecting portions 44a, 44b, 44c are brought into contact with an outer end of the case portion 41a at portions corresponding to the first to third mounting leg portions 41d, 41e, 41f respectively when a portion of the cylinder housing 44 is housed in the case portion 41a of the cylinder support member 41.

The cylinder support member 41 is fastened to the crankcase 20 using first, second and third bolts 48, 49, 50 which constitute fastening members. The hydraulic cylinder 40 is fastened to the cylinder support member 41 using the first and second bolts 48, 49 which are remaining bolts except the third bolt 50 which is one of the bolts 48 to 50.

More specifically, the first and second bolts 48, 49 are made to pass through the first and second mounting projecting portions 44a, 44b wherein the cylinder housing 44 of the hydraulic cylinder 40 includes and the first and second mounting leg portions 41d, 41e of the cylinder support member 41 respectively being threadedly engaged with the crankcase 20.

In a state where the cylinder support member 41 is mounted on the crankcase 20, as shown in FIG. 2, a portion of the case portion 41a overlaps with an outer periphery of the drive sprocket 24 as viewed from the axial direction of the output shaft 23. Also as shown in FIG. 2, the case portion 41a is arranged at a position where the case portion 41a is displaceable from the drive sprocket 24 as viewed in the axial direction of the output shaft 23.

As shown in FIG. 4, the third mounting leg portion 41f which the cylinder support member 41 includes is formed such that a crankcase-side leg portion 41fa which is brought into contact with the crankcase 20 and a cylinder-side leg portion 41fb which is arranged offset from the crankcase-side leg portion 41fa in the circumferential direction of the case portion 41a in a state where the cylinder-side leg portion 41fb is brought into contact with the third mounting projecting portion 44c of the hydraulic cylinder 40 are contiguously connected to each other in a stepwise manner. The crankcase-side leg portion 41fa is fastened to the crankcase 20 using the third bolt 50.

The hydraulic cylinder 40 is fastened to the cylinder support member 41 using a fourth bolt 51 which is a fastening member in addition to the first and second bolts 48, 49. The cover member 42 is fastened together with the hydraulic cylinder 40 to the cylinder-side leg portion 41fb of the third mounting leg portion 41f of the cylinder support member 41 using the fourth bolt 51 which is at least one of the first, second and fourth bolts 48, 49, 51.

More specifically, the fourth bolt 51 which is used for fastening the cover member 42 to the cylinder support member 41 together with the hydraulic cylinder 40 is provided independently from the first to third bolts 48, 49, 50 which are used for fastening the cylinder support member 41 to the crankcase 20.

Figure 6:
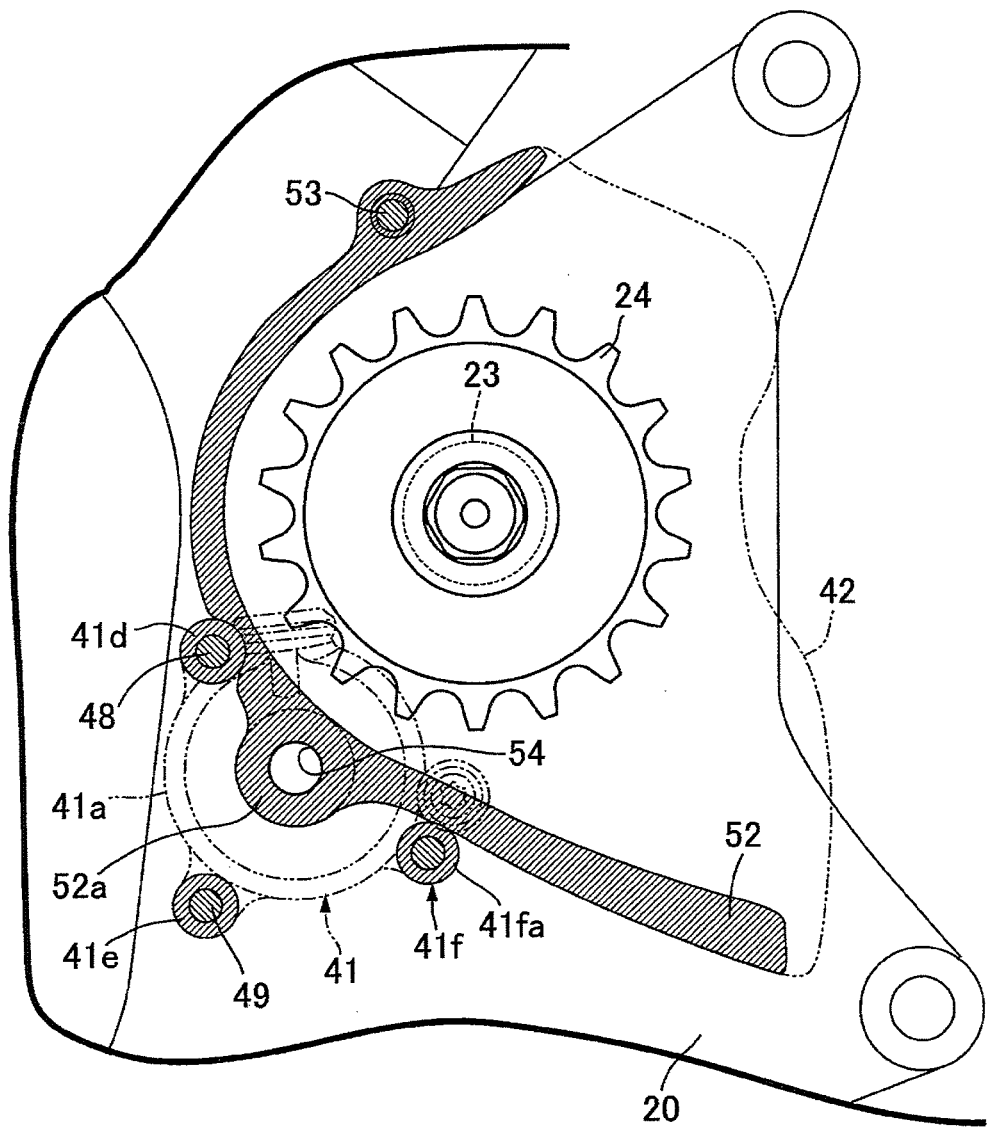
FIG. 6 is a cross-sectional view taken along a line 6-6 in FIG. 3.

To explain this embodiment also in conjunction with FIG. 6, a chain guide 52 which prevents the removal of the drive chain 25 from the drive sprocket 24 is fastened to the crankcase 20 together with an upper portion of the cover member 42 using a fifth bolt 53. The chain guide 52 is arranged around the drive sprocket 24 such that the chain guide 52 is brought into contact with the cylinder support member 41 at a position where the chain guide 52 is fastened to the crankcase 20, that is, a position different from a position where the fifth bolt 53 is arranged at the time of releasing the fastening of the chain guide 52 to the crankcase 20. In this embodiment, the chain guide 52 is brought into contact with the first and third mounting leg portions 41d, 41f of the cylinder support member 41 from above.

The push rod 39 is arranged on the center axis of the case portion 41a, and a ring portion 52a having a through hole 54 which is coaxial with the push rod 39 is integrally formed on the chain guide 52. A cylindrical member 55, for allowing the push rod 39 to pass therethrough, and the ring portion 52a, for surrounding the cylindrical member 55 and being brought into contact with the cylindrical member 55 from a side opposite to the crankcase 20, are sandwiched between the extending cylindrical portion 41b of the cylinder support member 41 and the crankcase 20.

Further, as apparently shown in FIG. 3, a cylindrical boss portion 20a for receiving the cylindrical member 55 is integrally formed on the crankcase 20 with a cutaway portion 56 being formed on a portion of the boss portion 20a on a side close to the drive chain 25.

Next, the manner of operation of this embodiment is explained. The cover member 42 which covers and surrounds the projecting end portion of the output shaft 23 projecting from the crankcase 20 of the engine body 19 is mounted on the crankcase 20. The cylinder support member 41 which has the case portion 41a for housing a portion of the hydraulic cylinder 40 and supports the hydraulic cylinder 40 is mounted on the crankcase 20 in a state where a portion of the case portion 41a is arranged in the opening portion 43 which is formed by cutting away a portion of the cover member 42. Accordingly, an offset amount of the hydraulic cylinder 40 to the cover member 42 in the axial direction can be decreased. Thus, the projection of the hydraulic cylinder 40 from the crankcase 20 in the axial direction can be suppressed whereby the power unit P can be miniaturized.

The drive sprocket 24 around which a drive chain 25 for transmitting power to the rear wheel WR side is wound is fixed to the projecting end portion of the output shaft 23 projecting from the crankcase 20. The cylinder support member 41 is arranged such that the case portion 41a is displaceable from the drive sprocket 24 in the axial direction in a state where a portion of the case portion 41a overlaps with the outer periphery of the drive sprocket 24 as viewed from the axial direction of the output shaft 23. Accordingly, an inter-axis distance between the input shaft 22 and the output shaft 23 of the transmission M can be shortened. Thus, the power unit P can be miniaturized in the direction which passes the axes of the input shaft 22 and output shaft 23 (in this embodiment, the longitudinal direction of the motorcycle).

The hydraulic cylinder 40 is fastened to the cylinder support member 41 by the first and second bolts 48, 49 which are remaining bolts except the third bolt 50 out of the first to third bolts 48 to 50 for fastening the cylinder support member 41 to the crankcase 20. Accordingly, the hydraulic cylinder 40 can be fastened to the cylinder support member 41 by making use of the first and second bolts 48, 49 out of the first to third bolts 48 to 50. Thus, the number of parts can be reduced and, at the same time, it is possible to easily perform an exchange operation where a sub-assembled part in a state where the hydraulic cylinder 40 is assembled to the cylinder support member 41 can be assembled to or removed from the crankcase 20 while maintaining the sub-assembled state.

The cover member 42 is fastened to the cylinder support member 41 together with the hydraulic cylinder 40 using the fourth bolt 51 which is at least one of the first, second and fourth bolts 48, 49, 50 for fastening the hydraulic cylinder 40 to the cylinder support member 41. Accordingly, the number of parts can be decreased thus contributing to the reduction in weight of the power unit P.

The fourth bolt 51 for fastening the cover member 42 to the cylinder support member 41 together with the hydraulic cylinder 40 is provided independently from the first to third bolts 48 to 50 for fastening the cylinder support member 41 to the crankcase 20. Accordingly, even when only the cover member 42 is exchanged, the cylinder support member 41 can be kept fixed to the crankcase 20 side. Thus, it is unnecessary to adjust the cylinder support member 41 which becomes necessary due to the removal of the cylinder support member 41 each time the cover member 42 is exchanged or removed whereby the exchange operation of the cover member 42 is facilitated.

The chain guide 52 which is fastened to the crankcase 20 so as to prevent the removal of the drive chain 25 from the drive sprocket 24 is arranged around the drive sprocket 24 such that the chain guide 52 is brought into contact with the cylinder support member 41 at the position different from the position where the chain guide 52 is fastened to the crankcase 20 at the time of releasing the fastening of the chain guide 52 to the crankcase 20. Accordingly, it is possible to prevent a state where the chain guide 52 is displaceable by being rotated at the time of exchanging the chain guide 52 thus avoiding the lowering of the assembling property caused by positional displacement of the chain guide 52.

The pushrod 39, for applying a push force to the clutch 29 is connected to the piston 45 of the hydraulic cylinder 40 and is arranged on the center axis of the case portion 41a, the ring portion 52a, having the through hole 54 coaxial with the pushrod 39 is integrally formed on the chain guide 52, and the cylindrical member 55, for allowing the pushrod 39 to pass therethrough and the ring portion 52a for surrounding the cylindrical member 55 and is brought into contact with the cylindrical member 55 from a side opposite to the crankcase 20, are sandwiched between the cylinder support member 41 and the crankcase 20. Accordingly, the chain guide 52 can be mounted on the crankcase 20 without providing a special means for fixing the chain guide 52 thus reducing the number of parts. Further, the chain guide 52 can be held on the crankcase 20 side even in a state where the cover member 52 is removed, Thus, the motorcycle can travel with the chain guide 52 being held on the crankcase 20 even in a state where the cover member 42 is removed such as during racing without increasing the number of parts.

The cylindrical boss portion 20a which receives the cylindrical member 55 is formed on the crankcase 20, and the cutaway portion 56 is formed on a portion of the boss portion 20a on a side close to the drive chain 25. Accordingly, an inter-axis distance between the hydraulic cylinder 40 and the output shaft 23 can be shortened while avoiding interference of the drive chain 25 with the boss portion 20a thus miniaturizing the power unit P in the direction which passes the axis of the hydraulic cylinder 40 and the axis of the output shaft 23 (in this embodiment, the longitudinal direction of the motorcycle).

Although the embodiment of the invention has been explained heretofore, the invention is not limited to the above-mentioned embodiment, and various modifications in design are conceivable without departing from the invention described in the scope of claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A power unit for a motorcycle comprising:
an internal combustion engine including a crankshaft rotatably supported on an engine body;
a transmission including an input shaft and an output shaft arranged parallel to each other and housed inside of the engine body;
a clutch for changing over the connection/disconnection of power transmission between the crankshaft and the input shaft;
a hydraulic cylinder for driving the clutch; and
a cylinder support member including a cylindrical case portion where a portion of the hydraulic cylinder is housed and is mounted on the engine body;
wherein a cover member for covering and surrounding a projecting end portion of the output shaft projecting from the engine body is mounted on the engine body, and the cylinder support member is mounted on the engine body such that a portion of the case portion is arranged in an opening portion formed by cutting away a portion of the cover member;
wherein the hydraulic cylinder is fastened to the cylinder support member and the engine body by a plurality of fastening members except one fastening member out of the plurality of fastening members is only utilized for fastening the cylinder support member to the engine body.

2. The power unit for a motorcycle according to claim 1, wherein a drive sprocket around which a drive chain for transmitting power to a rear wheel side is wound is fixed to the projecting end portion of the output shaft projecting from the engine body, and the cylinder support member is arranged such that a portion of the case portion overlaps with an outer periphery of the drive sprocket as viewed from the axial direction of the output shaft and the case portion is displaceable from the drive sprocket in the axial direction of the cylinder support member.

3. The power unit for a motorcycle according to claim 1, wherein the cover member is fastened to the cylinder support member together with the hydraulic cylinder using at least one fastening member out of the plurality of fastening members for fastening the hydraulic cylinder to the cylinder support member.

4. The power unit for a motorcycle according to claim 3, wherein the fastening member for fastening the cover member to the cylinder support member together with the hydraulic cylinder is provided independently from the fastening members for fastening the cylinder support member to the engine body.

5. The power unit for a motorcycle according to claim 2, wherein a chain guide which is fastened to the engine body so as to prevent the removal of the drive chain from the drive sprocket is arranged around the drive sprocket such that the chain guide is brought into contact with the cylinder support member at a position different from a position where the chain guide is fastened to the engine body at the time of releasing the fastening of the chain guide to the engine body.

6. The power unit for a motorcycle according to claim 5, wherein a pushrod for applying a push force to the clutch is connected to a piston of the hydraulic cylinder and is arranged on a center axis of the case portion, a ring portion having a through hole coaxial with the pushrod is integrally formed on the chain guide, and a cylindrical member for allowing the pushrod to pass therethrough and the ring portion which surrounds the cylindrical member and is brought into contact with the cylindrical member from a side opposite to the engine body are sandwiched between the cylinder support member and the engine body.

7. The power unit for a motorcycle according to claim 6, wherein a cylindrical boss portion for receiving the cylindrical member is formed on the engine body with a cutaway portion being formed on a portion of the boss portion on a side adjacent to the drive chain.

8. The power unit for a motorcycle according to claim 1, wherein a semi-circular portion of the cover member provides the cut away portion for forming an opening for mounting said hydraulic cylinder on the cylindrical support member disposed adjacent to the cover member.

9. A power unit for a motorcycle comprising:
a clutch for changing over a connection/disconnection of power transmission between a crankshaft and an input shaft;
a hydraulic cylinder for driving the clutch; and
a cylinder support member mounted on the engine body, said cylinder support member including a cylindrical case portion wherein a portion of the hydraulic cylinder is housed;
wherein a cover member is mounted on the engine body, said cover member covering and surrounding a projecting end portion of an output shaft projecting from the engine body, said the cylinder support member being mounted such that a portion of the case portion is arranged in an opening portion formed by cutting away a portion of the cover member;
wherein the hydraulic cylinder is fastened to the cylinder support member and the engine body by a plurality of fastening members except one fastening member out of the plurality of fastening members is only utilized for fastening the cylinder support member to the engine body.

10. The power unit for a motorcycle according to claim 9, wherein a drive sprocket around which a drive chain for transmitting power to a rear wheel side is wound is fixed to the projecting end portion of the output shaft projecting from the engine body, and the cylinder support member is arranged such that a portion of the case portion overlaps with an outer periphery of the drive sprocket as viewed from the axial direction of the output shaft and the case portion is displaceable from the drive sprocket in the axial direction of the cylinder support member.

11. The power unit for a motorcycle according to claim 9, wherein the cover member is fastened to the cylinder support member together with the hydraulic cylinder using at least one fastening member out of the plurality of fastening members for fastening the hydraulic cylinder to the cylinder support member.

12. The power unit for a motorcycle according to claim 11, wherein the fastening member for fastening the cover member to the cylinder support member together with the hydraulic cylinder is provided independently from the fastening members for fastening the cylinder support member to the engine body.

13. The power unit for a motorcycle according to claim 10, wherein a chain guide which is fastened to the engine body so as to prevent the removal of the drive chain from the drive sprocket is arranged around the drive sprocket such that the chain guide is brought into contact with the cylinder support member at a position different from a position where the chain guide is fastened to the engine body at the time of releasing the fastening of the chain guide to the engine body.

14. The power unit for a motorcycle according to claim 13, wherein a pushrod for applying a push force to the clutch is connected to a piston of the hydraulic cylinder and is arranged on a center axis of the case portion, a ring portion having a through hole coaxial with the pushrod is integrally formed on the chain guide, and a cylindrical member for allowing the pushrod to pass therethrough and the ring portion which surrounds the cylindrical member and is brought into contact with the cylindrical member from a side opposite to the engine body are sandwiched between the cylinder support member and the engine body.

15. The power unit for a motorcycle according to claim 14, wherein a cylindrical boss portion for receiving the cylindrical member is formed on the engine body with a cutaway portion being formed on a portion of the boss portion on a side adjacent to the drive chain.

16. The power unit for a motorcycle according to claim 9, wherein a semi-circular portion of the cover member provides the cut away portion for forming an opening for mounting said hydraulic cylinder on the cylindrical support member disposed adjacent to the cover member.

* * * * *